(12) United States Patent
Huang

(10) Patent No.: US 12,548,590 B2
(45) Date of Patent: Feb. 10, 2026

(54) STATIC ELECTRICITY ELIMINATION FLOATING TONEARM

(71) Applicant: Huan-Chih Huang, Changhua County (TW)

(72) Inventor: Huan-Chih Huang, Changhua County (TW)

( * ) Notice: Subject to any disclaimer, the term of this patent is extended or adjusted under 35 U.S.C. 154(b) by 0 days.

(21) Appl. No.: 18/742,440

(22) Filed: Jun. 13, 2024

(65) Prior Publication Data
US 2024/0420731 A1   Dec. 19, 2024

(30) Foreign Application Priority Data

Jun. 16, 2023 (TW) ................................. 112206208

(51) Int. Cl.
| | |
|---|---|
| G11B 3/58 | (2006.01) |
| G11B 3/12 | (2006.01) |
| G11B 3/31 | (2006.01) |

(52) U.S. Cl.
CPC .............. *G11B 3/5836* (2013.01); *G11B 3/12* (2013.01); *G11B 3/31* (2013.01)

(58) Field of Classification Search
None
See application file for complete search history.

(56) References Cited

U.S. PATENT DOCUMENTS

| | | | | |
|---|---|---|---|---|
| 3,479,038 A | * | 11/1969 | Eisner ...................... | G11B 3/20 |
| | | | | 369/255 |
| 4,083,073 A | * | 4/1978 | Bernardini ............. | G11B 3/589 |
| 4,087,095 A | * | 5/1978 | Koda ..................... | G11B 3/121 |
| | | | | 369/255 |

(Continued)

FOREIGN PATENT DOCUMENTS

| | | | | |
|---|---|---|---|---|
| TW | M288418 | | 3/2006 | |
| TW | M288418 U | * | 3/2006 | |
| WO | WO-2019105654 A1 | * | 6/2019 | ............... G11B 3/60 |

OTHER PUBLICATIONS

Air bearing Linear Tracking Tonearm diy, YouTube, uploaded by TEELA—audiophile ◆◆◆◆, Oct. 21, 2020 (Year: 2020).*

(Continued)

*Primary Examiner* — Steven Lim
*Assistant Examiner* — Michelle J. Kim
(74) *Attorney, Agent, or Firm* — Demian K. Jackson; Jackson IPG PLLC

(57) ABSTRACT

A static electricity elimination floating tonearm includes a tonearm base, a tonearm, a deflector and an ion air-pressure device. An air-floating arm tube extends horizontally from a side of the tonearm base, a top edge of the air-floating arm tube is provided with air holes arranged at intervals, the tonearm includes a floating piece and an arm rod, and the ion air-pressure device is provided for generating an airflow with positive and negative ions which is sent into the changer of the air-floating arm tube and blown out from the air holes of the air-floating arm tube, the floating piece together with the arm rod are blown upward to define an air-floating state, and deflected by the floating piece and the deflector and blown towards the turntable, not only providing a frictionless air-floating displacement state of the tonearm, but also eliminating static electricity and dust on the turntable.

12 Claims, 15 Drawing Sheets

(56) References Cited

U.S. PATENT DOCUMENTS

| | | | | | |
|---|---|---|---|---|---|
| 4,239,239 | A | * | 12/1980 | Masterson | G11B 3/38 |
| 4,455,641 | A | * | 6/1984 | Sliski | G11B 3/38 |
| | | | | | 369/252 |
| 4,628,500 | A | * | 12/1986 | Thigpen | G11B 3/38 |
| | | | | | 369/255 |
| 6,850,403 | B1 | * | 2/2005 | Gefter | H01T 23/00 |
| | | | | | 361/230 |

OTHER PUBLICATIONS https://www.youtube.com/watch?v=6sDtzmHVW8w (Year: 2012).*
https://www.youtube.com/watch?v=cxoMWiRmkHE (Year: 2020).*

* cited by examiner

STATIC ELECTRICITY ELIMINATION FLOATING TONEARM

BACKGROUND OF THE DISCLOSURE

Technical Field

The present disclosure relates to a tonearm of a record player, and more particularly to a static electricity elimination floating tonearm of a record player.

Description of the Related Art

In general, when a record player is in use, a stylus of a tonearm will be placed on the outer circle of a turntable's track, and then as the turntable rotates, the stylus will gradually move along the turntable's track and rubs against the inner circle of the track in order to read music signals and play the music, and when the stylus moves to the inner circle of the track, causing the tonearm to pivot to a termination groove, the stylus will stop moving.

The traditional tonearm is mainly a pivot arm. The pivot arm operates by using an end of the pivot arm as a rotating pivot, which is fixed to one side of the turntable, while the other end of the pivot arm carries a stylus and drives the pivot arm to move in an arc shape across the top of the turntable by turning the pivot of the pivot arm. In terms of physical characteristics, only when the pivot arm is perpendicular to the radius of the turntable can the stylus fall on the position of the tangent point, then the curved arm operated in a curved manner, even with precision adjustment, will only have one or two tangent points, and the rest will have an error, which is known as tracking error. Tracking errors of this sort will lead to the stylus at the front end of the pivot arm unable to travel perfectly in the V-shaped groove, resulting in distortion and error, and lots of overdrives and distortions that often occur in a general turntable are caused by tracking errors.

Therefore, related manufacturers have developed a floating tonearm, such as the "Improved structure of reading arm for record player" disclosed in Taiwan Utility Model Publication No. M288418, wherein a related-art floating tonearm has an air hole formed on a carrier bar, the carrier bar is sheathed with a sleeve, the sleeve is combined with an arm rod, an end of the arm rod is provided with a cartridge, and a stylus is provided inside the cartridge, such that when air blows out from the air hole, the carrier bar at the sleeve is in a frictionless air-floating displacement state, and the stylus can read music information in a more sensitive and responsive manner to reduce the occurrence of audio output distortion.

However, although the aforementioned related-art floating tonearm can make the arm rod to be in an air-floating state, it cannot eliminate the static electricity and dust on the turntable, which will easily lead to the stylus unable to travel perfectly in the sound groove, resulting in popping, sound distortion and other conditions affecting the quality of the sound, and may even damage the stylus or reduce the service life of the stylus, and shock the users by the static electricity on the turntable.

SUMMARY OF THE DISCLOSURE

The present disclosure provides a static electricity elimination floating tonearm, which includes: a tonearm base having an air-floating arm tube horizontally extending from a side of the tonearm, a chamber formed inside the air-floating arm tube, and a plurality of air holes arranged at intervals, formed at the top edge of the air-floating arm tube, and communicated with the chamber; a tonearm, including a floating piece and an arm rod, wherein the floating piece has a cross-section in the shape of a semicircular elongated sheet, and arranged on the air-floating arm tube, the arm rod and the floating piece are combined to form a cross, and an end of the arm rod is provided with a cartridge; and an ion air-pressure device, for generating an airflow with positive and negative ions, wherein the ion air-pressure device includes an air duct communicated with the chamber of the air-floating arm tube, so that the airflow with positive and negative ions is sent into the chamber of the air-floating arm tube, and blown out from the air holes of the air-floating arm tube, so as to drive the floating piece together with the arm rod to be blown upward to define an air-floating state, and blow the airflow with positive and negative ions towards the turntable.

The objective of the present disclosure is not only to make the air-floating arm tube at the tonearm to be in the frictionless air-floating displacement state, but also to allow the stylus to read music information in a more sensitive and responsive manner, so as to reduce the occurrence of audio output distortion and control the airflow with positive and negative ions to blow towards the turntable and achieve the effects of eliminating the static electricity and dust on the turntable, ensuring the perfect sound quality, extending the service life of the stylus, and preventing users from being shocked by the static electricity on the turntable.

DESCRIPTION OF THE PREFERRED EMBODIMENTS

Figure 1:
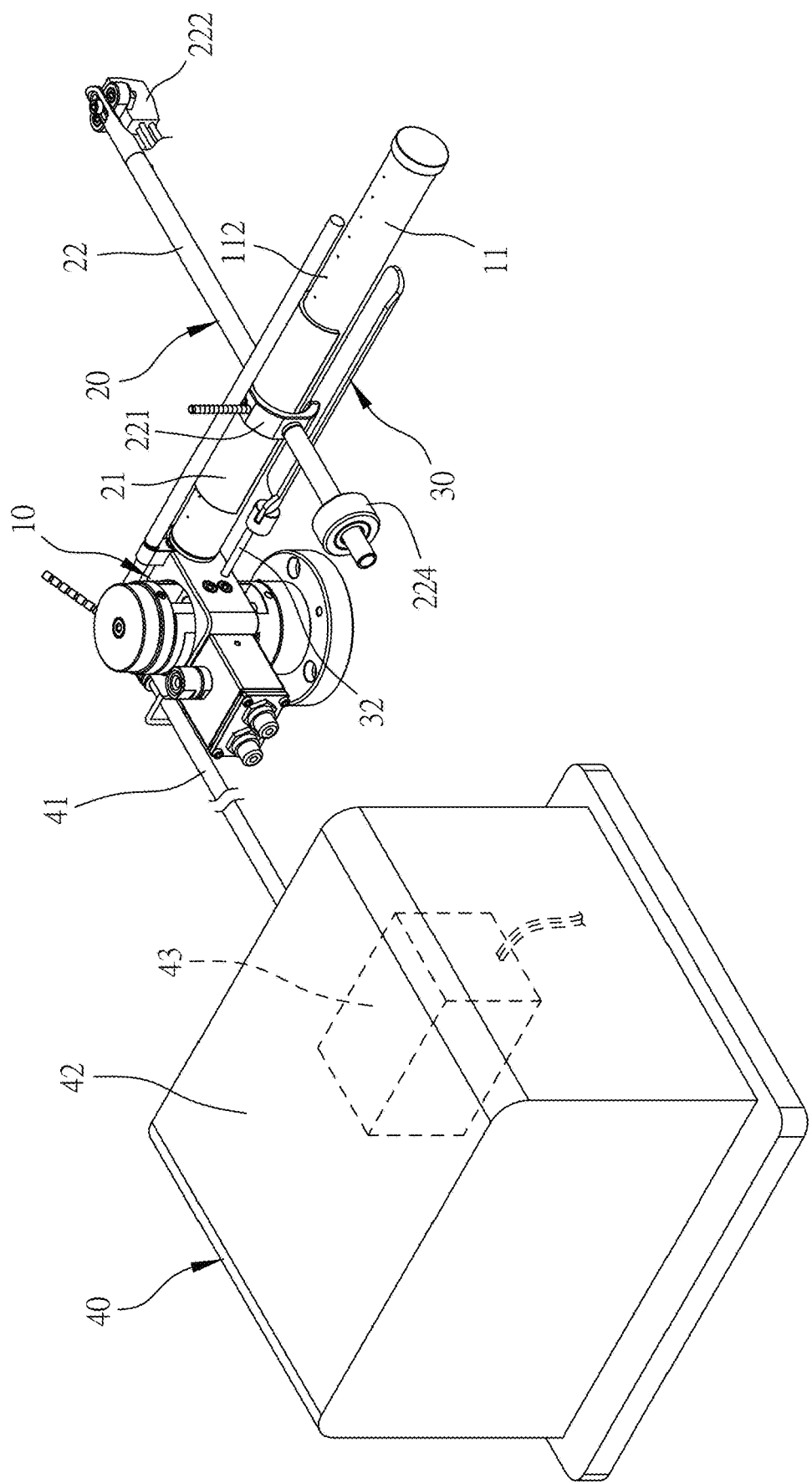
FIG. 1 is a perspective view of the present disclosure.
Figure 2:
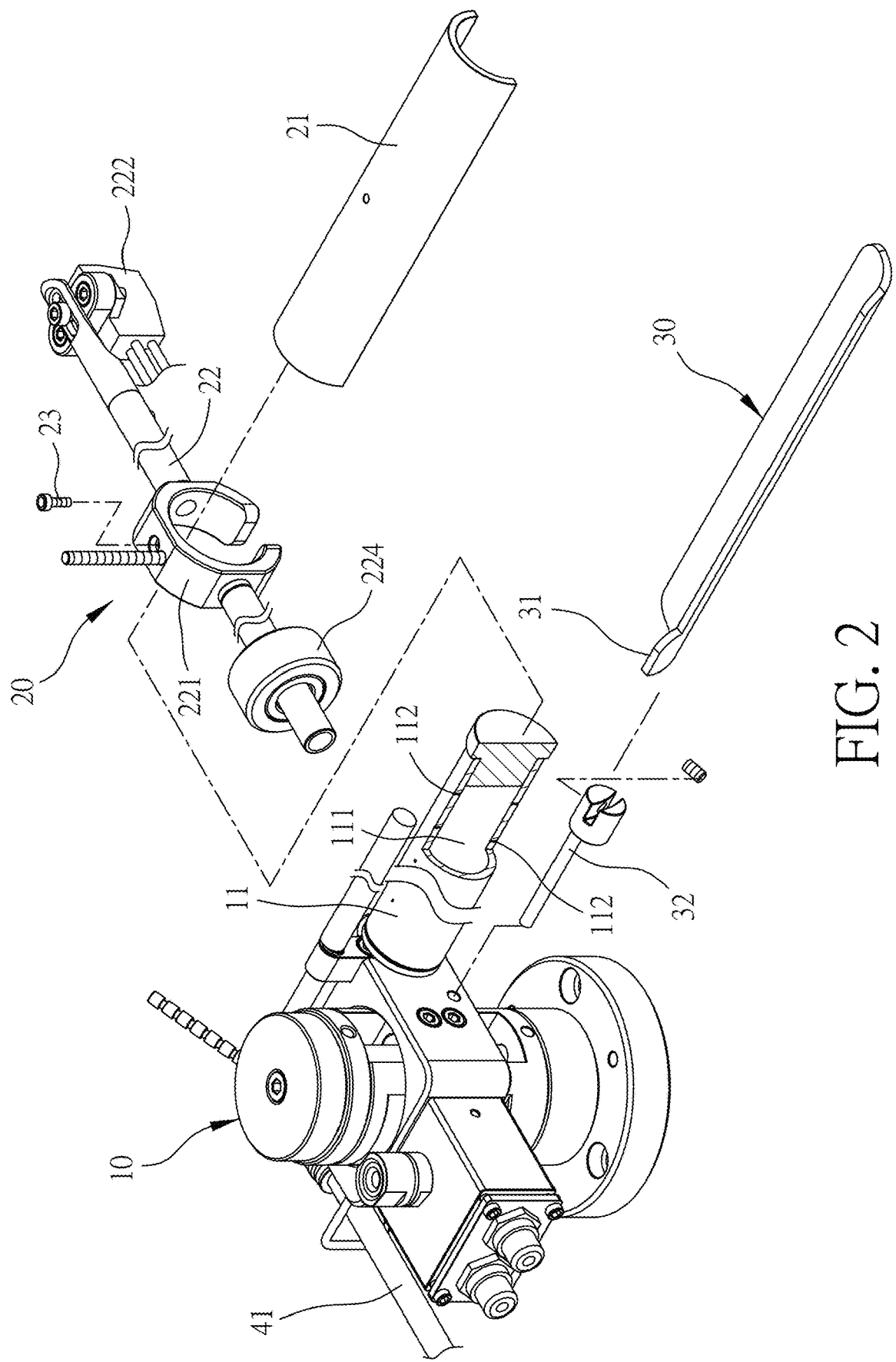
FIG. 2 is an exploded view of the present disclosure.
Figure 3:
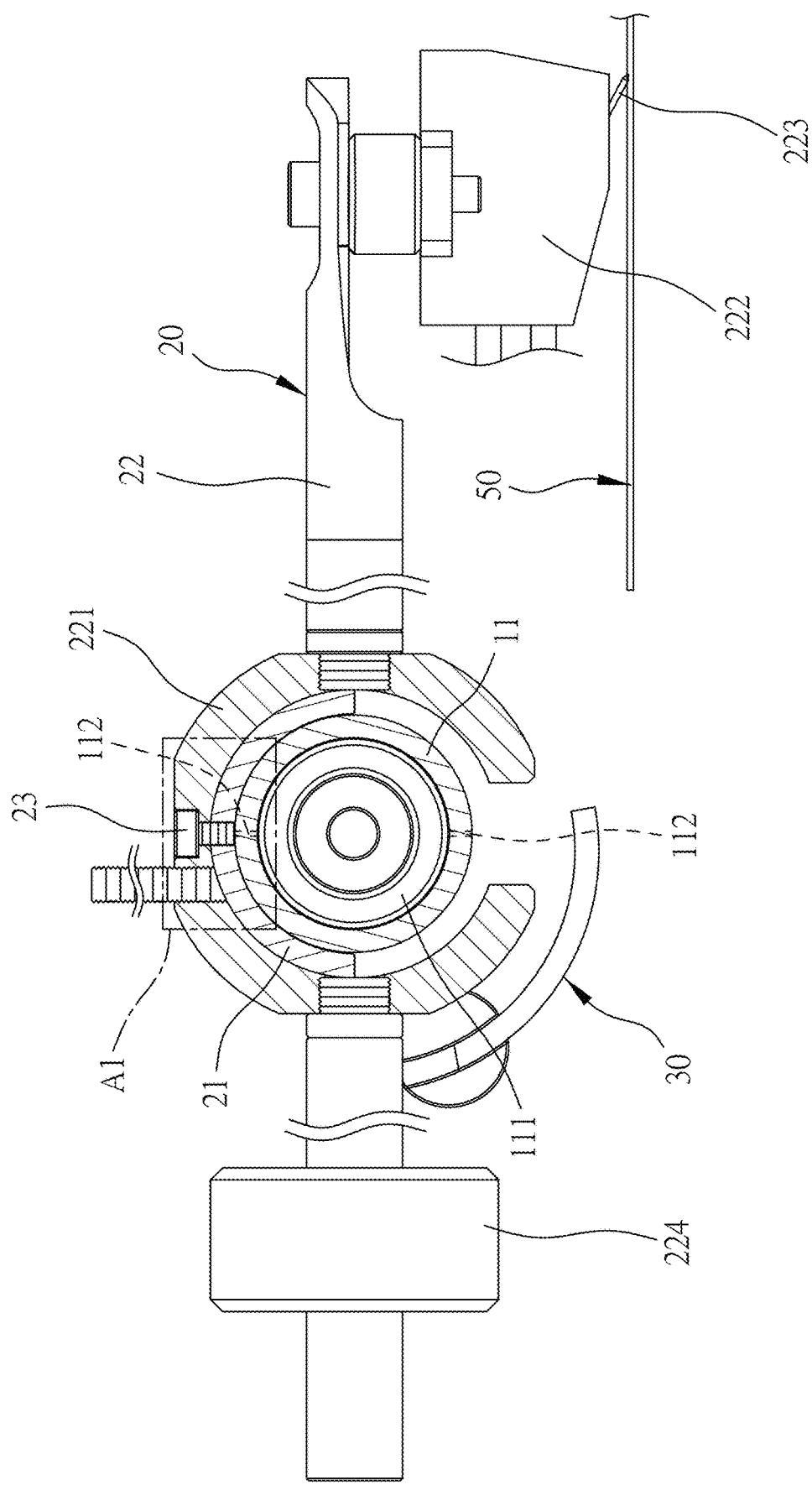
FIG. 3 is a cross-sectional view of the present disclosure.
Figure 4:
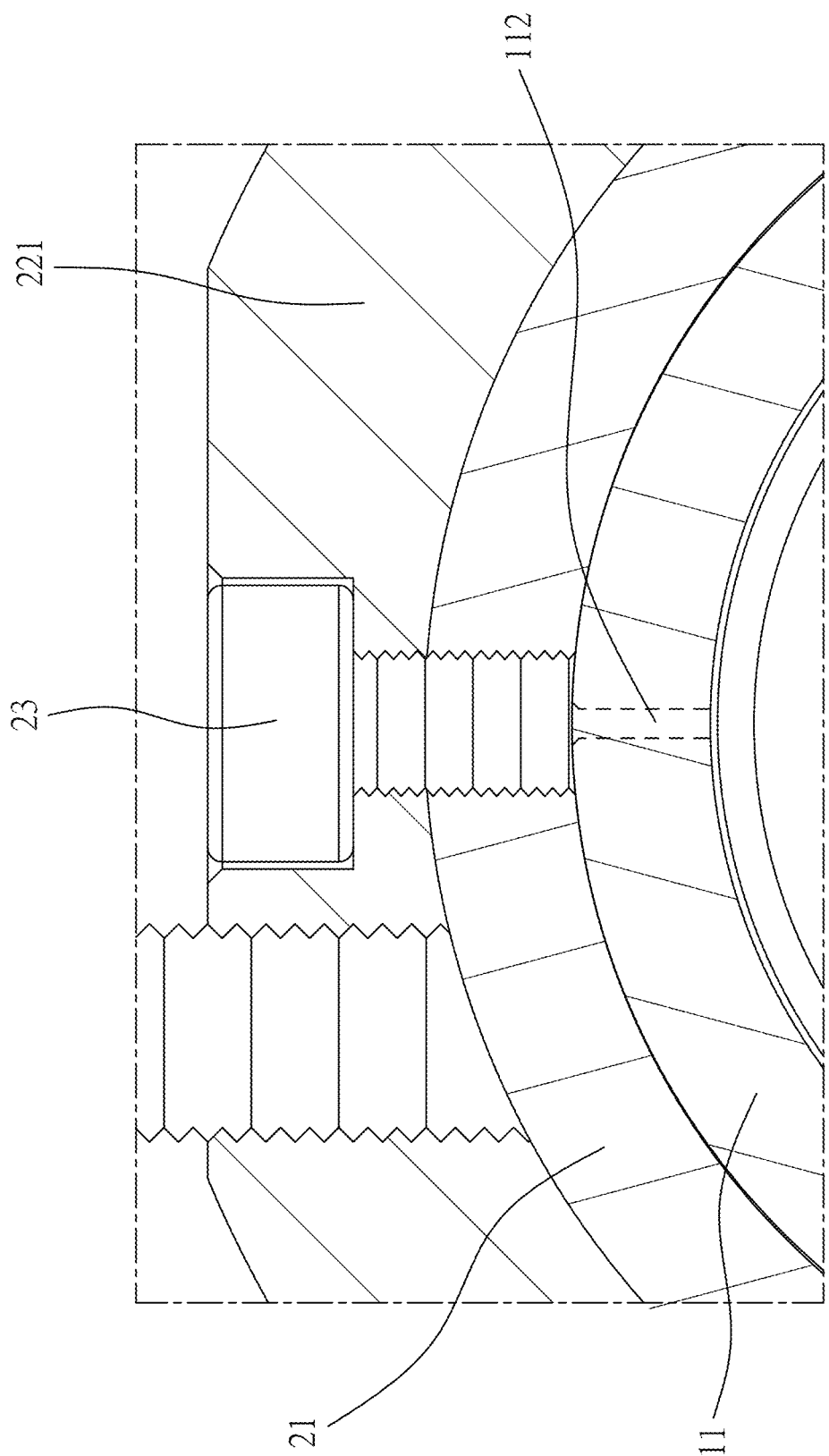
FIG. 4 is a blowup view of Section A1 of FIG. 3.
Figure 5:
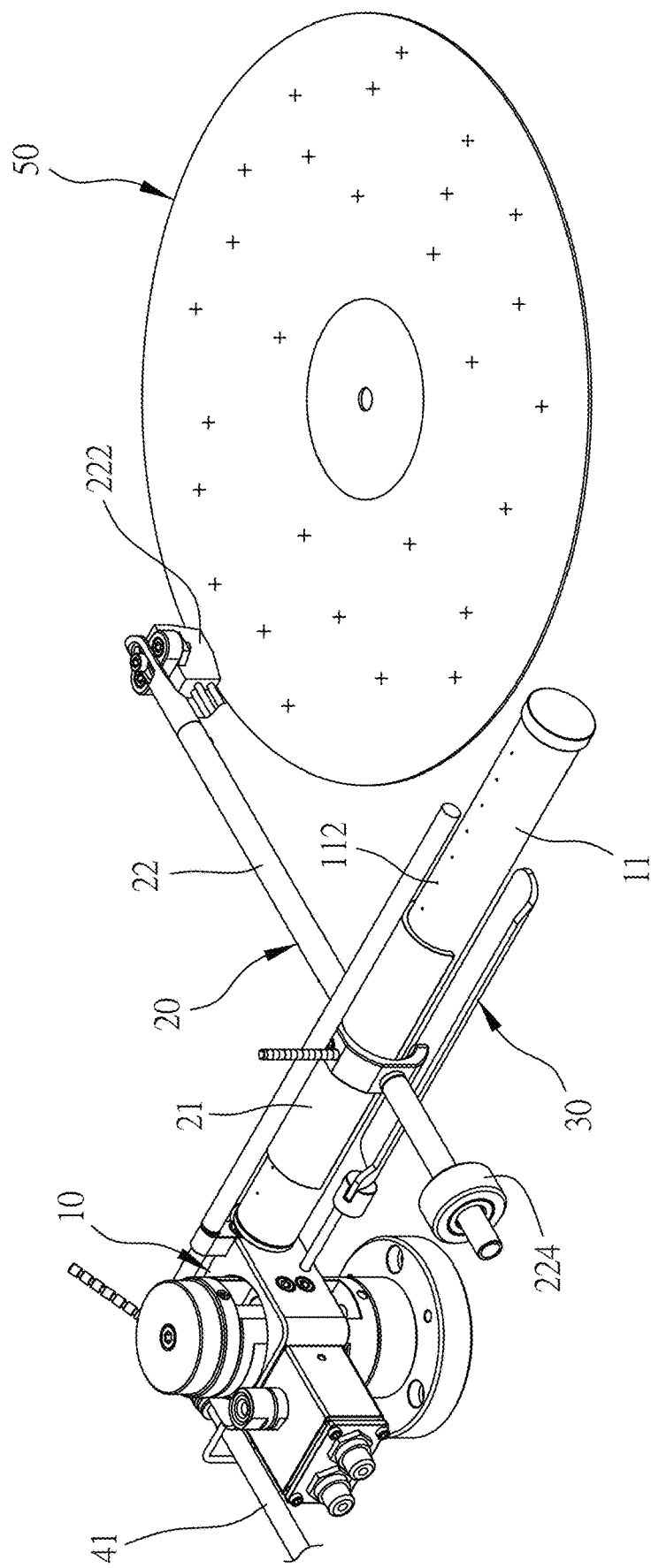
FIG. 5 is a schematic view showing a turntable of the present disclosure that carries static electricity.
Figure 6:
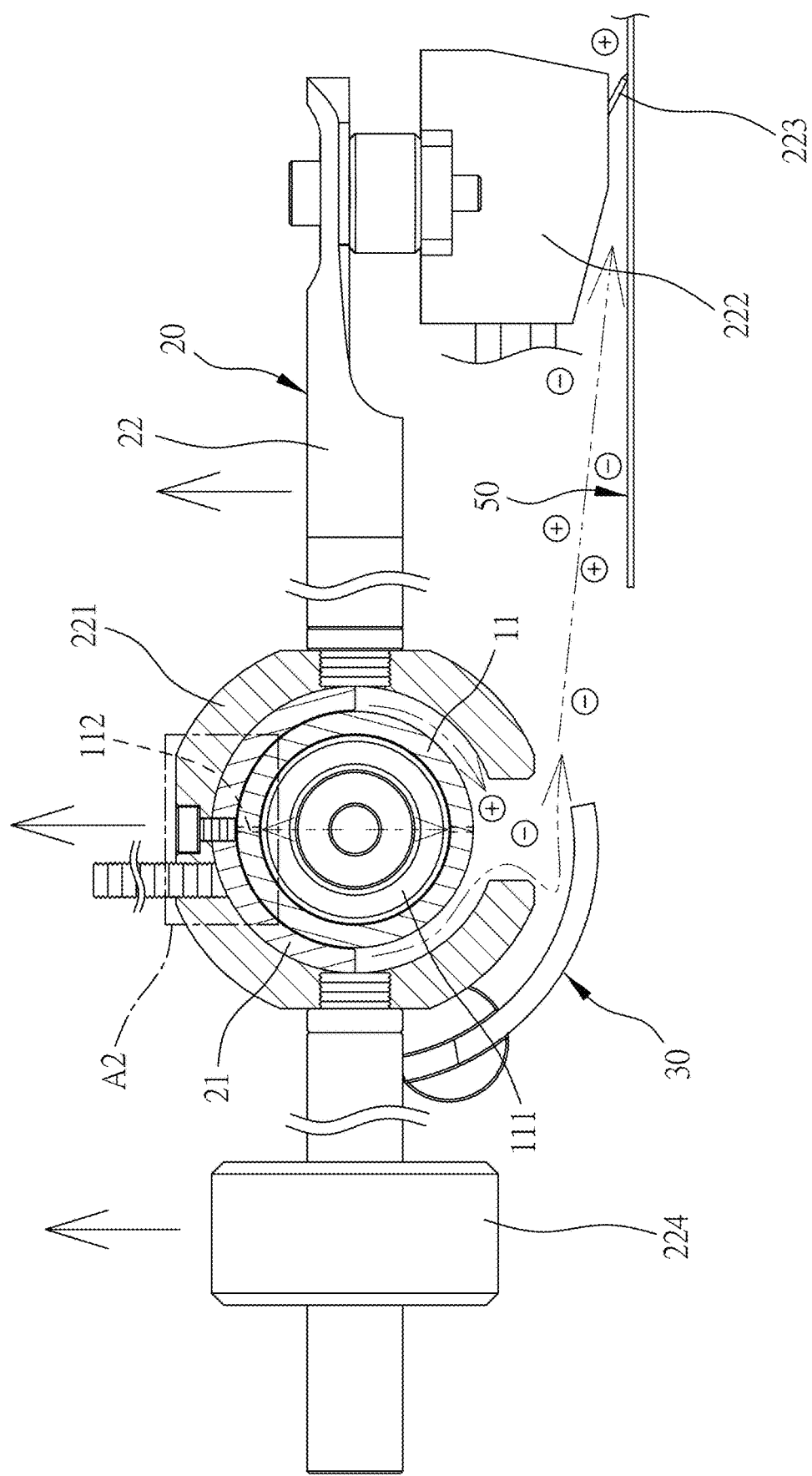
FIG. 6 is a cross-sectional view showing a using status of the present disclosure.
Figure 7:
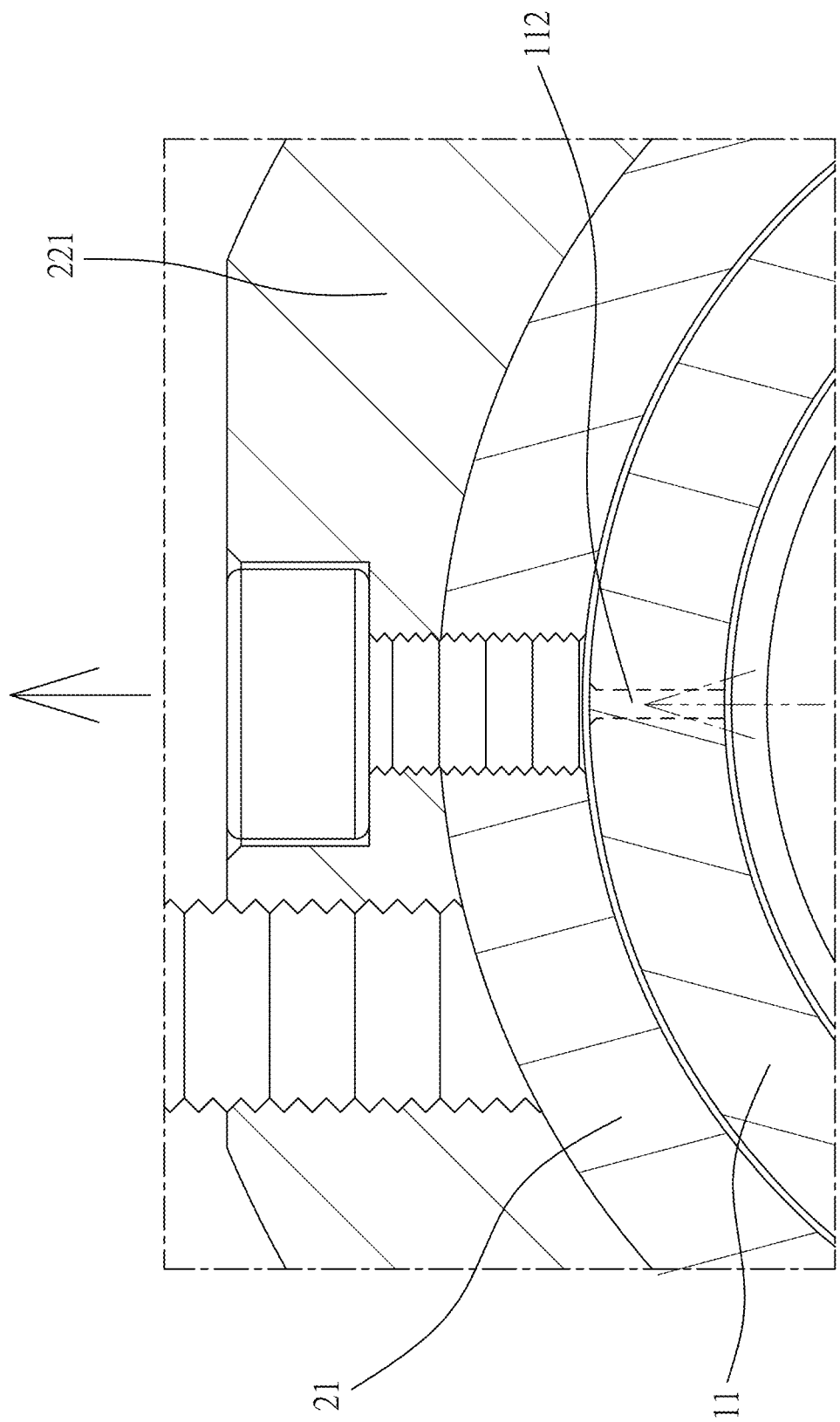
FIG. 7 is a blowup view of Section A2 of FIG. 6.
Figure 8:
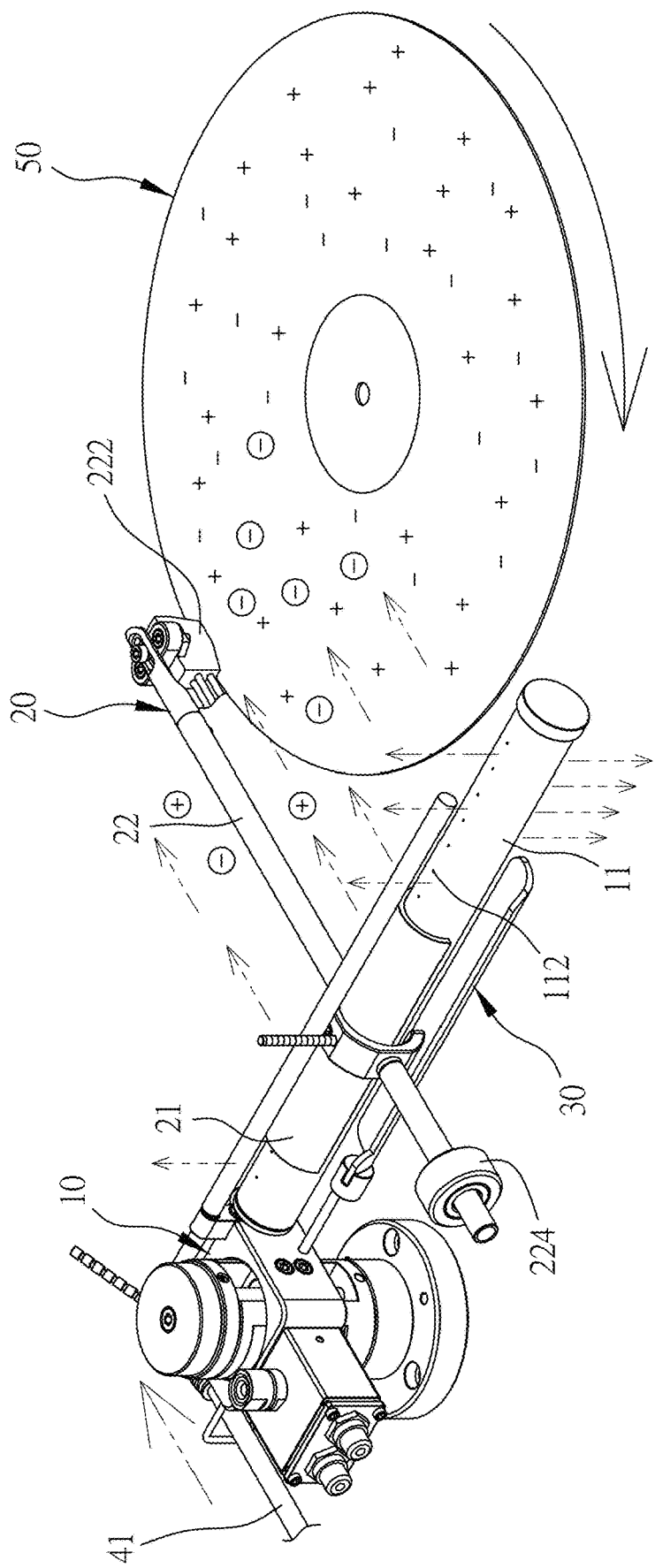
FIG. 8 is a schematic view showing a turntable of the present disclosure that eliminates static electricity and dust on the turntable.

With reference to FIGS. 1 to 4 for a static electricity elimination floating tonearm of the present disclosure, the static electricity elimination floating tonearm includes a tonearm base 10, a tonearm 20, a deflector 30 and an ion air-pressure device 40.

An air-floating arm tube 11 extends horizontally from a side of the tonearm base 10, the air-floating arm tube 11 has a circular cross-section, a chamber 111 is formed in the air-floating arm tube 11, and the top edge and bottom edge of the air-floating arm tube 11 are respectively provided with a plurality of air holes arranged at intervals 112 and communicating with the chamber 111.

The tonearm 20 includes a floating piece 21 and an arm rod 22, the floating piece 21 has a cross-section in the shape of a semicircular elongated sheet and is installed on the air-floating arm tube 11, the arm rod 22 is a long arm and combined with the floating piece 21 by a combining seat 221, such that the arm rod 22 and the air-floating arm tube 11 form a cross, the combining seat 221 is C-shaped with opening facing down and sheathed on the air-floating arm tube 11, an end of the arm rod 22 is provided with a cartridge 222, the cartridge 222 includes a stylus 223, the other end of the arm rod 22 is provided with a counterweight 224, such that two ends of the arm rod 22 are in an equilibrium state, and in this embodiment, the combining seat 221 and the floating piece 21 are combined by locking a screw 23.

The deflector 30 and the air-floating arm tube 11 are parallelly installed on a side of the air-floating arm tube 11, and in this embodiment, the deflector 30 has an arc-shaped cross-section, an end of the deflector 30 is provided with a fixing part 31, and the fixing part 31 is provided to cooperate with a balance bar 32 and fixed to the tonearm base 10.

The ion air-pressure device 40 is provided for generating an airflow with positive and negative ions, the ion air-pressure device 40 includes an air duct 41 and a chamber 111 communicating with the air-floating arm tube 11, such that the airflow with positive and negative ions can be sent into the chamber 111 of air-floating arm tube 11 and blown out from the air hole 112 of the air-floating arm tube 11. In this embodiment, the air duct 41 is connected to the tonearm base 10 and communicating with the chamber 111 of the air-floating arm tube 11 through the tonearm base 10, the ion air-pressure device 40 includes an air pump 42 and an ion generator 43, the ion generator 43 is installed in the air pump 42, the air pump 42 is connected to the ion generator 43, and the ion generator 43 is connected to the air duct 41.

In FIGS. 5 to 8, static electricity and dust are attached to the turntable 50 easily and during the use of the present disclosure, the air pumped out from the air pump 42 of the ion air-pressure device 40 is passed through the ion generator 43 to form an airflow with positive and negative ions, the air duct 41 is provided for sending the airflow with positive and negative ions into the chamber 111 of the air-floating arm tube 11 and passed out from the air hole 112 of the air-floating arm tube 11, such that the floating piece 21 of the tonearm 20 is driven by the upward air to prop the fixed interval above the air-floating arm tube 11, and an air bearing is formed between the floating piece 21 of the tonearm 20 and the air-floating arm tube 11 so as to set the floating piece 21 of the tonearm 20 together with the arm rod 22 into an air-floating state. In this way, the cartridge 222 at an end of the arm rod 22 abuts against the turntable 50 by the stylus 223, and when the turntable rotates, the tonearm 20 spirally move along the groove of the turntable 50 to read the music information of the turntable 50, and play the music recorded in the turntable 50, and the airflow with positive and negative ions blown out from the air hole 112 at the top edge of the air-floating arm tube 11 is blocked by the floating piece 21, and deflected downward from the fixed interval between the floating piece 21 and the air-floating arm tube 11 and guided towards the turntable 50 by the deflector 30, while the airflow with positive and negative ions blown out from the air hole 112 at the bottom edge of the air-floating arm tube 11 is deflected towards the turntable 50 by the deflector 30, where the positive and negative ions in the airflow neutralize static charges on the turntable 50 to form an ion balance and eliminate the static electricity, and the airflow with positive and negative ions also blows away the dust on the turntable 50 to achieve the effect of eliminating the static electricity and dust on the turntable 50.

Figure 9:
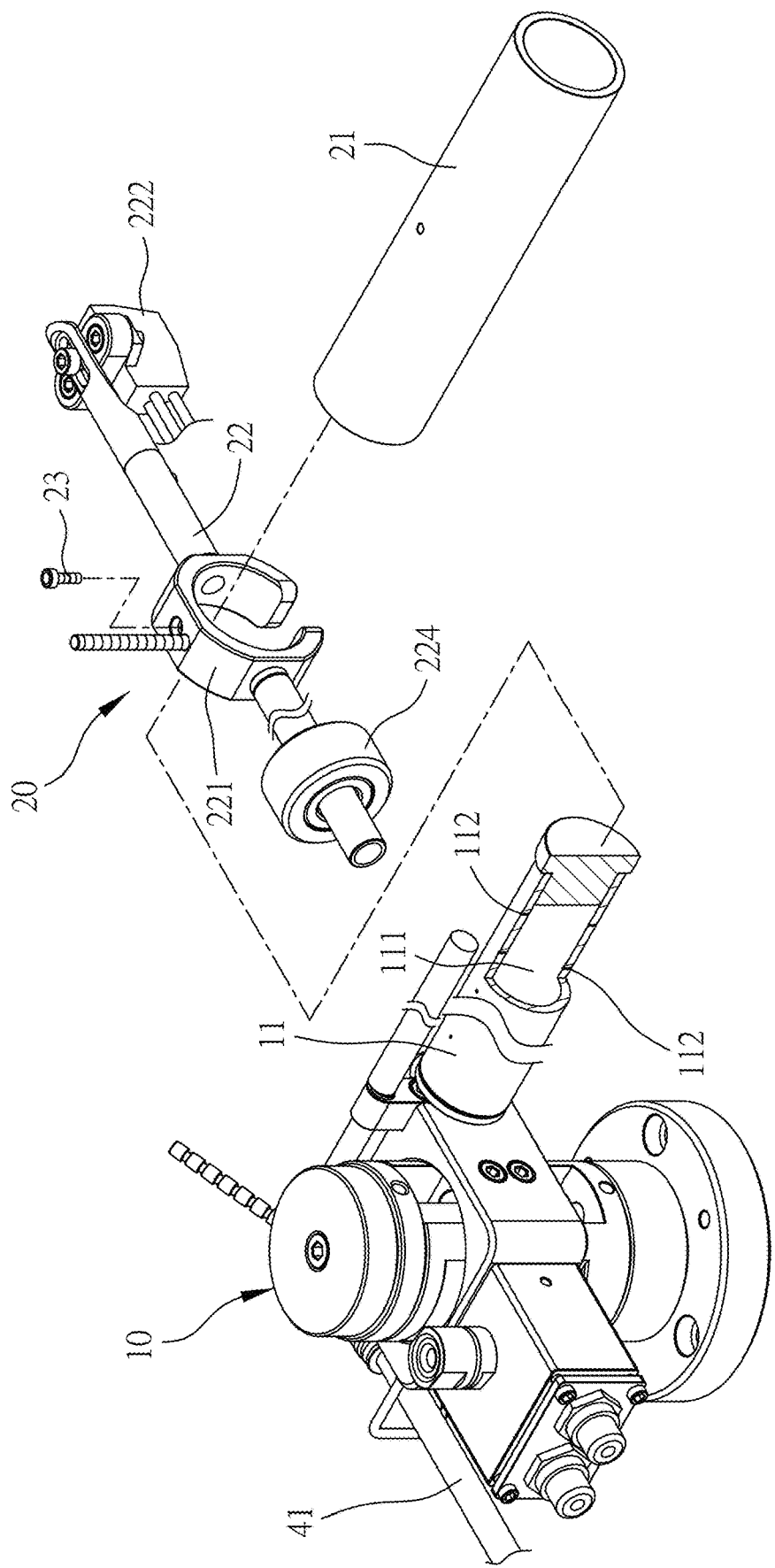
FIG. 9 is an exploded view of another embodiment of the present disclosure.
Figure 10:
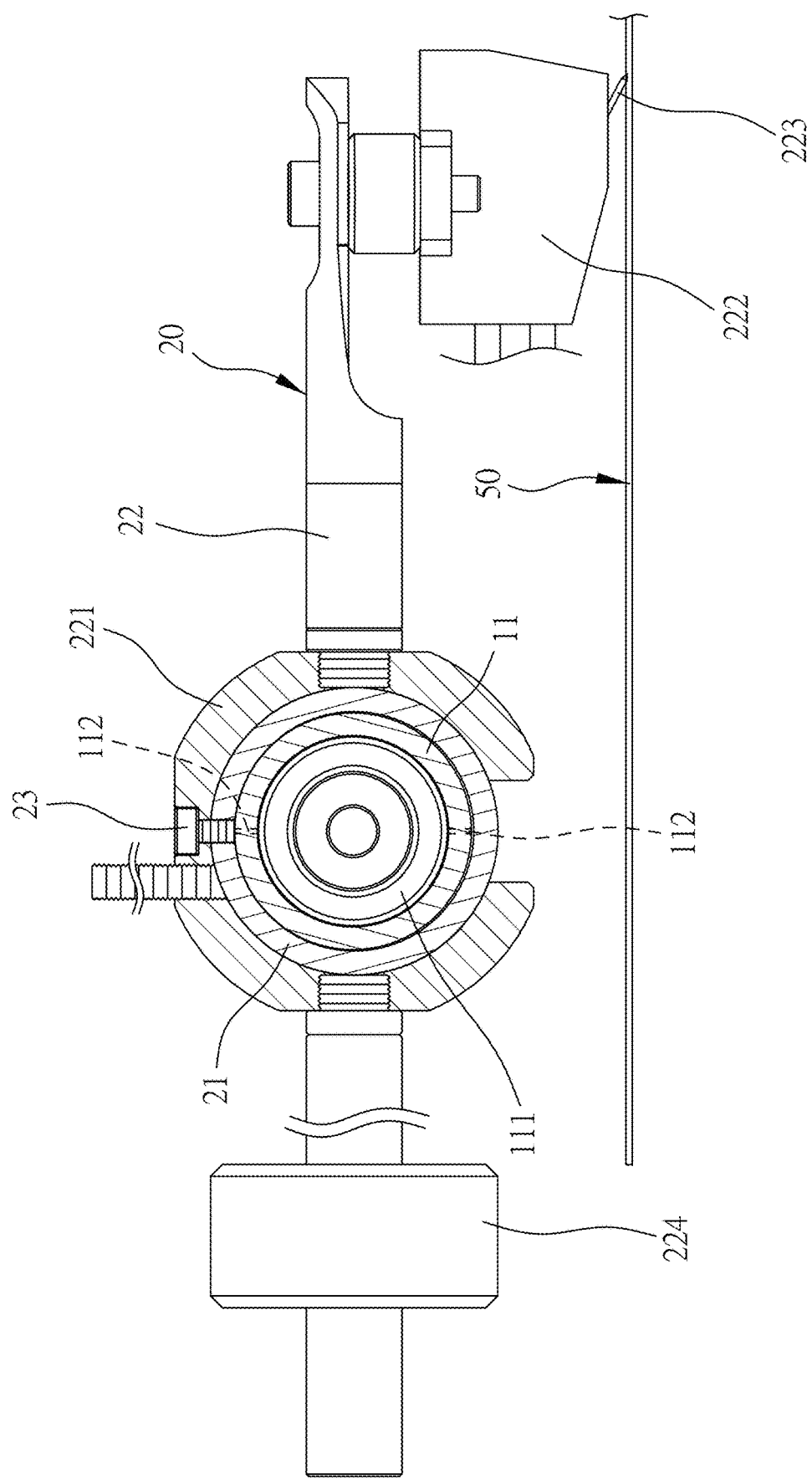
FIG. 10 is a cross-sectional view of another embodiment of the present disclosure.
Figure 11:
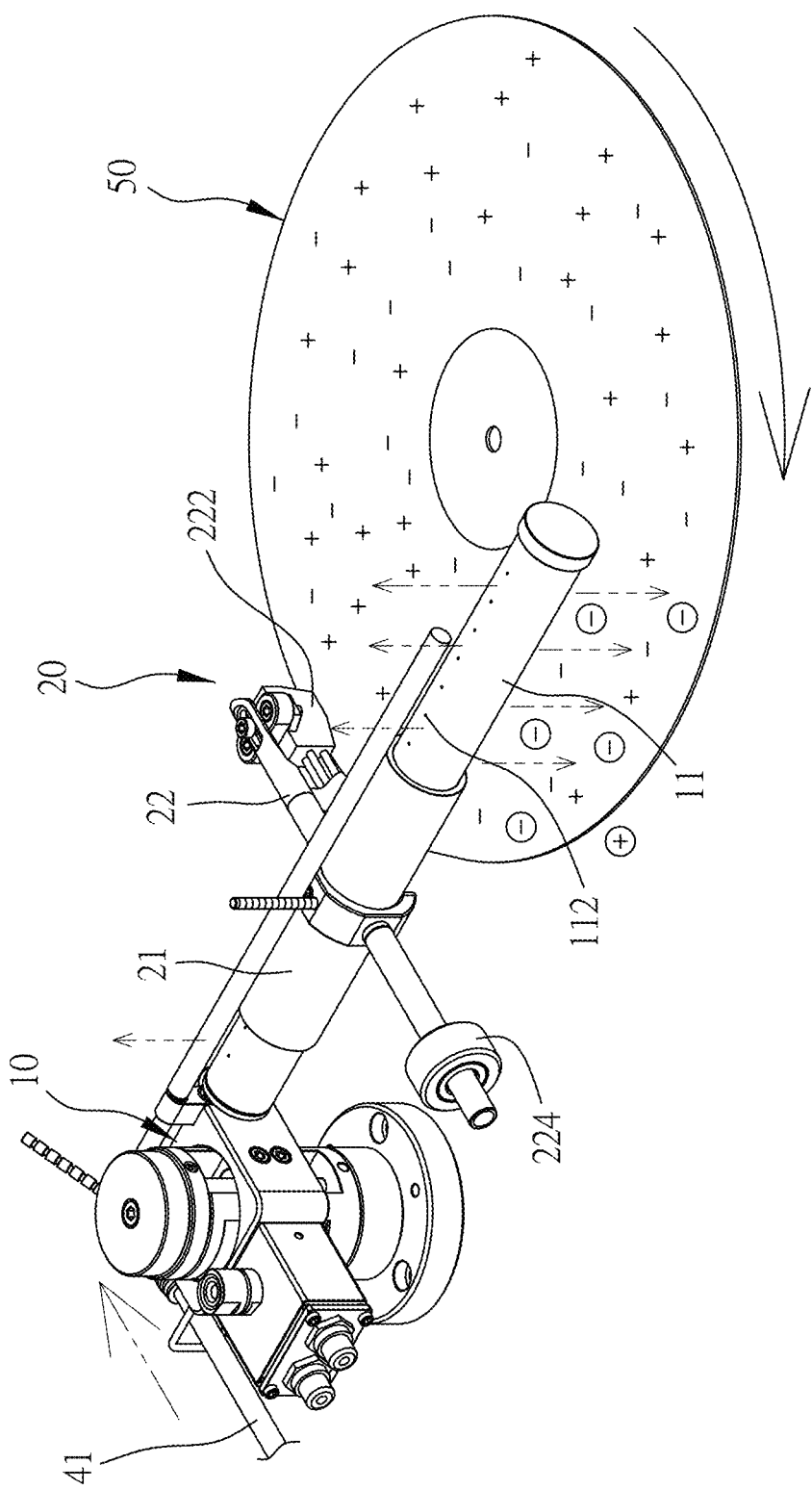
FIG. 11 is a schematic view showing a turntable of another embodiment of the present disclosure that eliminates static electricity and dust on the turntable.

With reference to FIGS. 9 to 11 for another embodiment of the present disclosure, the difference between this embodiment and the foregoing embodiments is that the arm rod 22 is a short arm, the floating piece 21 is a round sleeve, and there is no deflector 30. During use, the air pumped out from the air pump 42 of the ion air-pressure device 40 is passed through the ion generator 43 to form an airflow with positive and negative ions, and the air duct 41 is provided for sending the airflow with positive and negative ions into the chamber 111 of the air-floating arm tube 11 and blowing the airflow with positive and negative ions out from the air hole 112 of the air-floating arm tube 11, such that the floating piece 21 of the tonearm 20 is driven by the upward air to prop the fixed interval above the air-floating arm tube 11, an air bearing is formed between the floating piece 21 of the tonearm 20 and the air-floating arm tube 11 to set the floating piece 21 of the tonearm 20 together with the arm rod 22 to an air-floating state, and the airflow with positive and negative ions blown out from the air hole 112 at the bottom edge of the air-floating arm tube 11 directly blows at the turntable 50, such that the positive and negative ions in the airflow neutralize the static charges on the turntable 50 to form an ion balance and eliminate the static electricity, and the airflow with positive and negative ions blows away the dust on the turntable 50, so as to achieve the effect of eliminating the static electricity and dust on the turntable 50.

Figure 12:
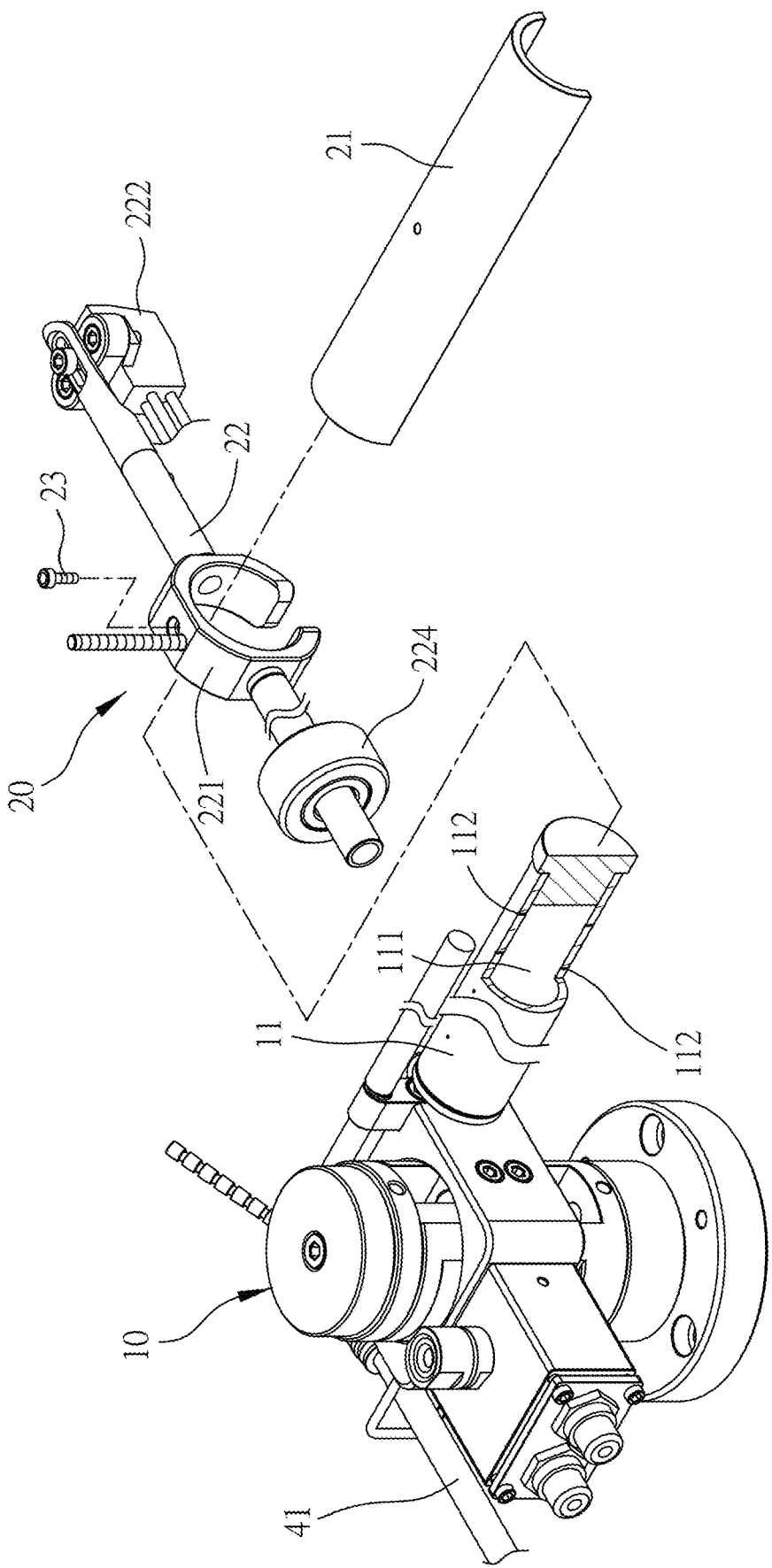
FIG. 12 is an exploded view of a further embodiment of the present disclosure.
Figure 13:
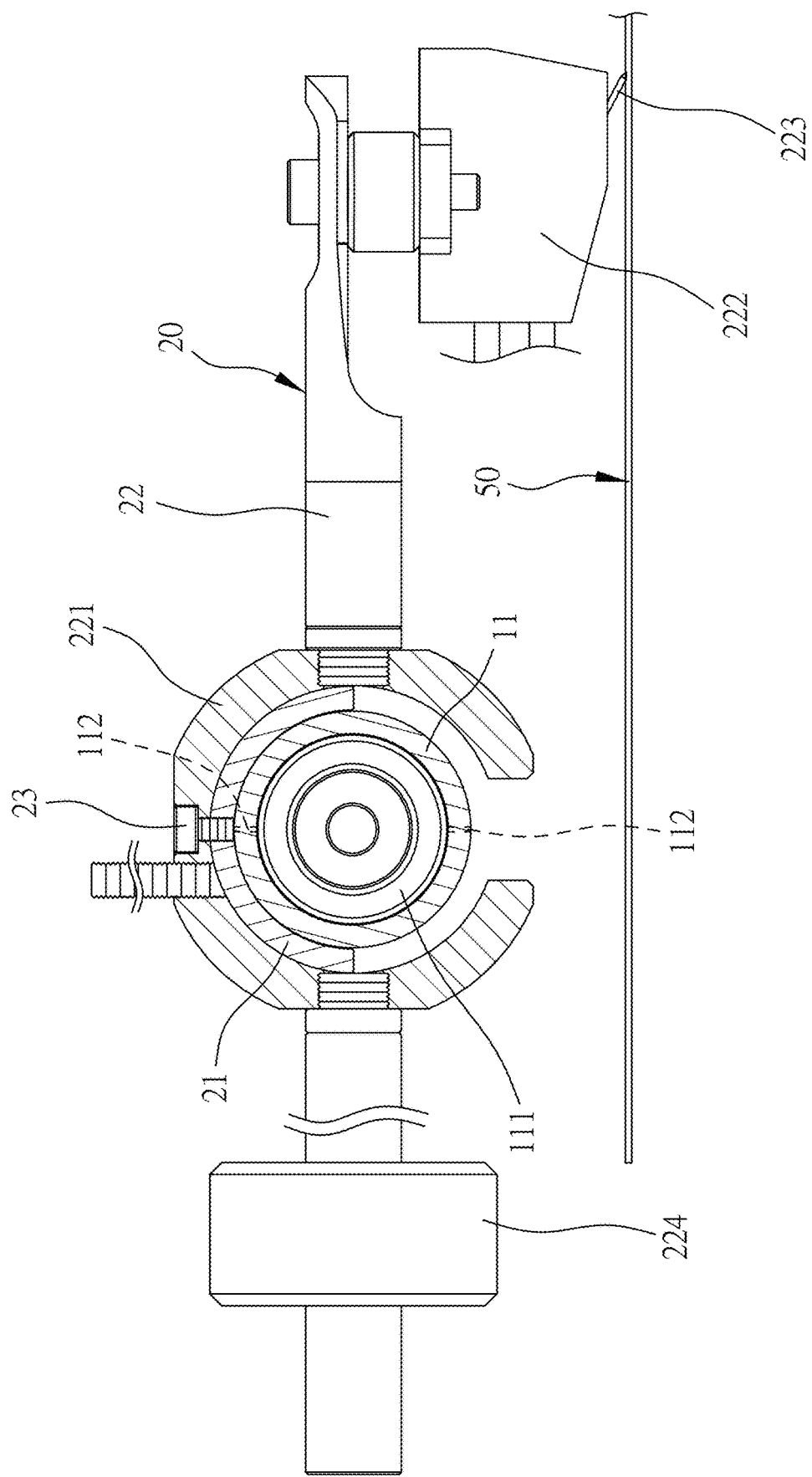
FIG. 13 is a cross-sectional view of a further embodiment of the present disclosure.
Figure 14:
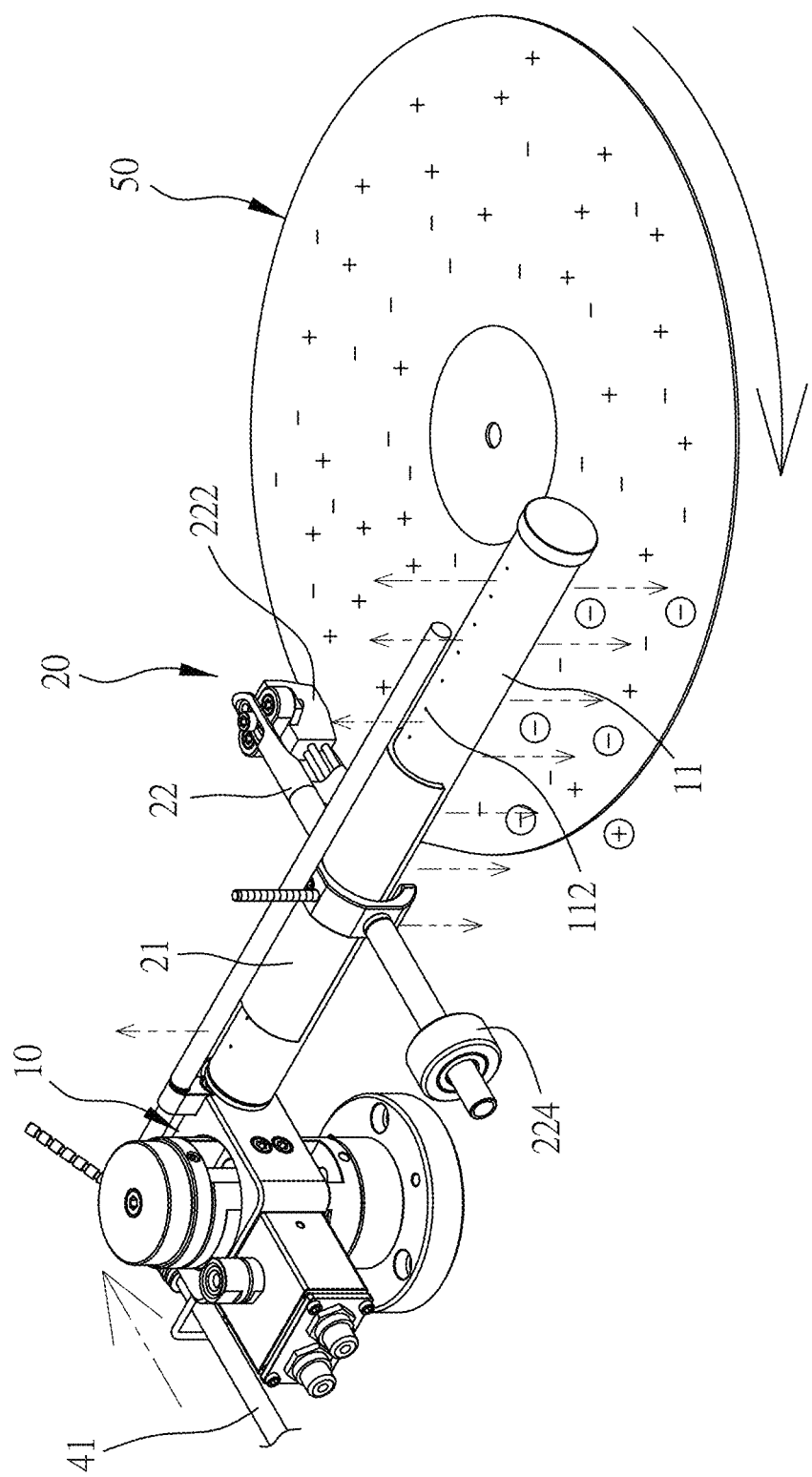
FIG. 14 is a schematic view of a further embodiment of the present disclosure that eliminates static electricity and dust on the turntable.

With reference to FIGS. 12 to 14 for a further embodiment of the present disclosure, the difference between this embodiment and the foregoing embodiments is that the arm rod 22 is a short arm, the floating piece 21 has a cross-section in the shape of a semicircular elongated sheet, there is no the deflector 30. During use, the air pumped out from the air pump 42 of the ion air-pressure device 40 is passed through the ion generator 43 to form an airflow with positive and negative ions, and the air duct 41 is provided for sending the airflow with positive and negative ions into the chamber 11 of the air-floating arm tube 111 and blowing out the airflow with positive and negative ions from the air hole 112 of the air-floating arm tube 11, so that the floating piece 21 of the tonearm 20 is driven by the upward air to prop the fixed interval above the air-floating arm tube 11, and an air bearing is formed between the floating piece 21 of the tonearm 20 and the air-floating arm tube 11, so as to set the floating piece 21 of tonearm 20 together with the arm rod 22 to an air-floating state, and the airflow with positive and negative ions blown out from the air hole 112 at the top edge of the air-floating arm tube 11 is blocked by the floating piece 21 and deflected downward along the fixed interval between the floating piece 21 and the air-floating arm tube 11 towards the turntable 50, while the airflow with positive and negative ions blown out from the air hole 112 at the bottom edge of the air-floating arm tube 11 directly blows at the turntable 50, such that the positive and negative ions in the airflow neutralize the static charges on the turntable 50 to form an ion balance and eliminate the static electricity, and the airflow with positive and negative ions blows away the dust on the turntable 50, so as to achieve the effect of eliminating the static electricity and dust on the turntable 50.

Figure 15:
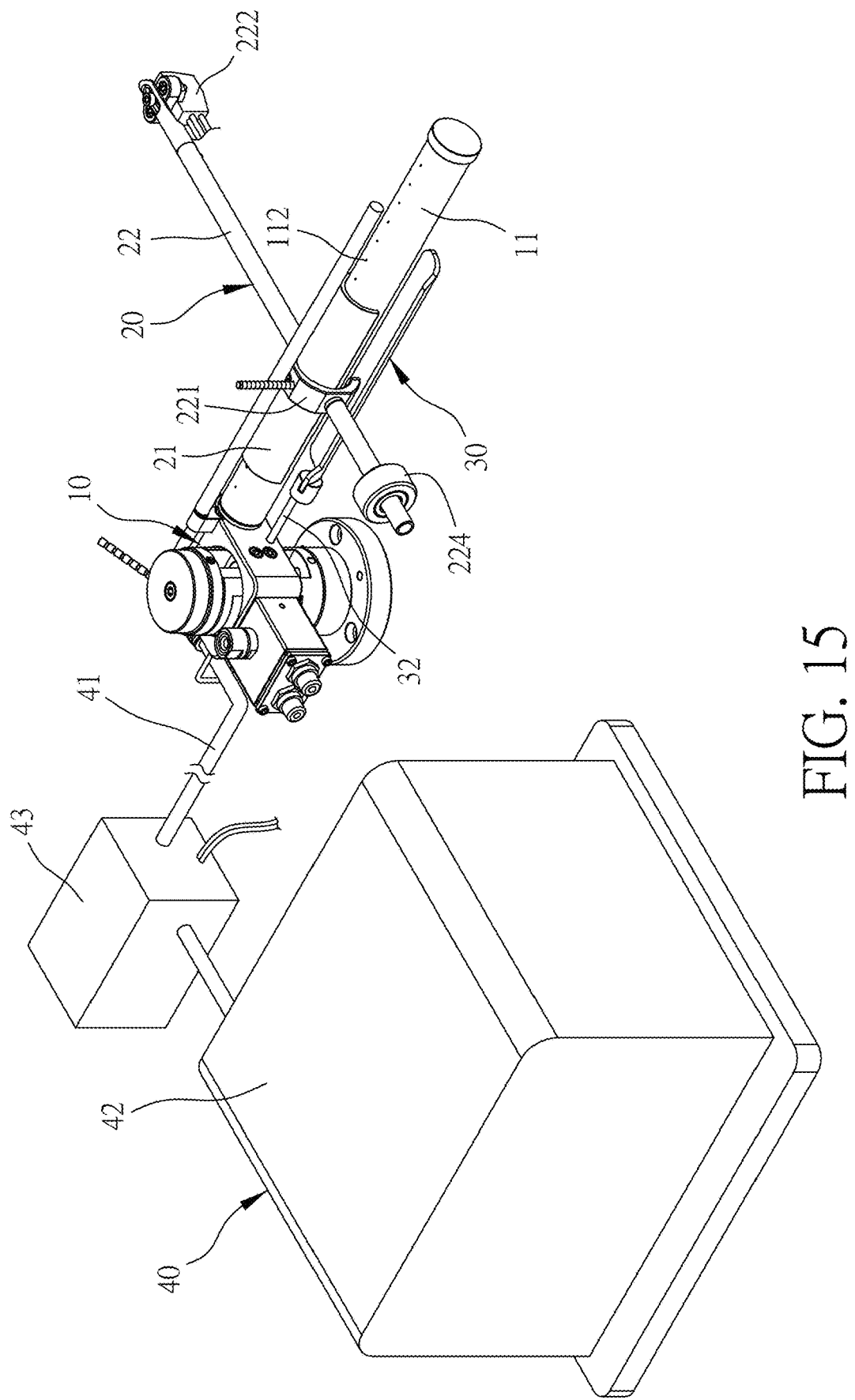
FIG. 15 is a perspective view of another further embodiment of the present disclosure.

With reference to FIG. 15 for another further embodiment of the present disclosure, the difference between this embodiment and the foregoing embodiments is that the ion generator 43 is installed outside the air pump 42.

With the structure of the above specific embodiments, the present disclosure has the following advantages:

The present disclosure static electricity elimination floating tonearm not only sets the air-floating arm tube 11 of the tonearm 20 to the frictionless air-floating displacement state, but also makes the stylus 223 to read music information in a more sensitive and responsive manner, so as to reduce the occurrence of audio output distortion and guide and control the airflow with positive and negative ions to blow towards the turntable 50 and the airflow with positive and negative ions eliminates the static electricity and dust on the turntable 50 to achieve the effects of ensuring perfect sound quality, extending the service life of stylus 223, and preventing users from being shocked by the static electricity on the turntable 50.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A static electricity elimination floating tonearm assembly comprising:
   a tonearm base;
   a tonearm comprising:
      an air-floating arm tube pivotably connected to and extending horizontally from the tonearm base and with a chamber formed inside the air-floating arm tube and a plurality of air holes arranged at intervals and formed at a top edge of the air-floating arm tube and communicating with the chamber;
      a floating piece arranged on the air-floating arm tube and an arm rod combined with the floating piece such that the arm rod and the air-floating arm tube form a cross, and
      a cartridge disposed at an end of the arm rod; and
   an ion air-pressure device generating an airflow with positive and negative ions, the ion air-pressure device comprising an air duct communicating with the chamber of the air-floating arm tube, such that the airflow with positive and negative ions is sent into the chamber of the air-floating arm tube and blown out from the air holes of the air-floating arm tube, so as to blow the floating piece together with the arm rod to move upward and define an air-floating state, and the airflow with positive and negative ions is further blown towards a turntable.

2. The assembly of claim 1, wherein a bottom edge of the air-floating arm tube is provided with a plurality of air holes arranged at intervals.

3. The assembly of claim 1, further comprising a deflector with an arc-shaped cross-section, the deflector and the air-floating arm tube being parallelly arranged on a side of the air-floating arm tube, such that after the airflow with positive and negative ions generated by the ion air-pressure device is blown out from the air holes, the airflow with positive and negative ions is deflected by the floating piece and the deflector and blown towards the turntable.

4. The assembly of claim 2, further comprising a deflector with an arc-shaped cross-section, the deflector and the air-floating arm tube being parallelly arranged on a side of the air-floating arm tube, such that after the airflow with positive and negative ions generated by the ion air-pressure device is blown out from the air holes, the airflow with positive and negative ions is deflected by the floating piece and the deflector and blown towards the turntable.

5. The assembly of claim 1, wherein the air-floating arm tube has a cross-section in a circular shape.

6. The assembly of claim 2, wherein the air-floating arm tube has a cross-section in a circular shape.

7. The assembly of claim 1, wherein the floating piece has a cross-section in the shape of a semicircular semi cylindrical elongated sheet.

8. The assembly of claim 1, wherein the floating piece is a round sleeve.

9. The assembly of claim 1, wherein the arm rod is combined with the floating piece by a combining seat, the other end of the arm rod is provided with a counterweight, and the combining seat and the floating piece are combined by a locking screw.

10. The assembly of claim 7, wherein the combining seat is C-shaped with opening facing downward, and sheathed on the air-floating arm tube.

11. The assembly of claim 1, wherein the air duct is coupled to the tonearm base and communicated with the chamber of the air-floating arm tube through the tonearm base.

12. The assembly of claim 1, wherein the ion air-pressure device comprises an air pump and an ion generator.

* * * * *